United States Patent
Klamer

(10) Patent No.: US 6,784,971 B2
(45) Date of Patent: Aug. 31, 2004

(54) DIGITAL PROJECTING APPARATUS AND METHOD WITH ASYMMETRICAL STROBOSCOPY

(75) Inventor: Paul R. Klamer, Flintridge, CA (US)

(73) Assignee: Warner Communications Inc., New York, NY (US)

(*) Notice: Subject to any disclaimer, the term of this patent is extended or adjusted under 35 U.S.C. 154(b) by 89 days.

(21) Appl. No.: 09/942,813

(22) Filed: Aug. 30, 2001

(65) Prior Publication Data

US 2002/0044355 A1 Apr. 18, 2002

Related U.S. Application Data

(60) Provisional application No. 60/229,462, filed on Sep. 1, 2000.

(51) Int. Cl.[7] .............................. G03B 21/32; G03B 9/08
(52) U.S. Cl. ......................................... 352/85; 352/204
(58) Field of Search ........................ 352/85, 204, 244; 353/122; 348/743, 490

(56) References Cited

U.S. PATENT DOCUMENTS

| | | | |
|---|---|---|---|
| 3,603,722 A | 9/1971 | Graham | 348/490 |
| 5,448,314 A | 9/1995 | Heimbuch et al. | 348/743 |
| 5,900,982 A | 5/1999 | Dolgoff et al. | 359/619 |
| 5,917,558 A | 6/1999 | Stanton | 348/743 |
| 6,329,971 B2 * | 12/2001 | McKnight | 345/95 |
| 6,386,711 B1 * | 5/2002 | Petruchik et al. | 353/122 |

OTHER PUBLICATIONS

PCT International Search Report; PCT/US01/26909; filed Aug. 30, 2001; Applicant: Time Warner Entertainment Co., LP.

* cited by examiner

*Primary Examiner*—Rodney Fuller

(57) ABSTRACT

A digital projector that projects moving images from a data stream also generates black intervals selected to induce a stroboscopic effect in a viewer's eye. The black signals are interspaced with the images in a manner so as to simulate the operation of a standard movie projector thereby insuring that the effects of temporal and spatial artefacts normally associated with digital projectors are reduced.

17 Claims, 3 Drawing Sheets

DIGITAL PROJECTING APPARATUS AND METHOD WITH ASYMMETRICAL STROBOSCOPY

RELATED APPLICATIONS

This application claims priority to provisional application No. 60/229,462 filed Sep. 1, 2000 and incorporated herein by reference.

BACKGROUND OF THE INVENTION

A. Field of Invention

This invention pertains to a display apparatus which receives digital signals and converts the same into moving images. More particularly, the subject invention pertains to an apparatus and method in which asymmetrical stroboscopy is used to eliminate spatial and temporal artefacts from the moving images.

B. Description of the Prior Art

Historically, motion pictures have been recorded as a series of still positive transparent images or frames on a transparent media (e.g., film). The images were then projected as a sequence of frames at a relatively fast rate (normally at 24 frames per second) on a passive screen. These still images are perceived by the human eye as moving pictures. Three separate physiological phenomenon contribute to this effect: persistence of vision, phenomenal movement (also known as the Phi effect) and a specific stroboscopic phenomenon which is referred to herein as the 'blink effect'. The first phenomenon refers to the eye's ability to retain an image for a period of time after it impinges on the retina. The second phenomenon pertains to the eye's propensity to interpret similar images projected in quick sequence on the retina as corresponding to a moving object. The third phenomenon is very important in dealing with images of moving objects. This phenomenon is based on the eye's perception of similar images interrupted by a black interval. The eye (or more properly, the visual cortex of the brain) interprets the black interval as an eye blink and two similar images separated by the black period are interpreted as representing a moving object. Advantageously, as a film is shown via a standard movie projector, its frames are separated by a black interval generated by a shutter while a current frame is replaced by a succeeding frame. The duration of this black interval is commensurate with the blink effect.

A problem with standard motion picture projectors is that they are only capable of showing moving images from a transparent film. Another problem with these projectors is that they cannot be used to show moving images from digital signals and therefore the digital signals must be converted into images that are then recorded on a standard film. This process is expensive, and the various conversion steps degrade the picture quality.

During the last several years, digital projectors have been developed which can be used to project moving images from digital signals. As many content providers are adapting digital technology as a means of creating motion pictures, digital projectors are gaining acceptance as the primary means for generating motion pictures. However, independently of what technology they use, digital projectors do not utilize shutters. Therefore, the images that make up a typical motion picture are not separated by black intervals and the blink effect is not present. As a result, when a motion picture is shown through a digital projector, its images appear jerky or smeared. Surprisingly, this effect can occur at both very high and very low rates, as explained in more detail below.

OBJECTIVES AND SUMMARY OF THE INVENTION

In view of the above-disadvantages of the prior art, it is an objective of the present invention to provide a digital projector that has an improved motion rendition by inducing a blink effect in the viewer's eyes.

A further objective is to provide a digital projector with an improved performance without requiring major changes in its design.

Other objectives and advantages of the invention shall become apparent from the following description of the invention. Briefly, the subject application pertains to a digital projector having an input receiving digital data defining image frames; and an optical modulator adapted to generate a sequence of images of a moving object corresponding to the digital data. Advantageously, the images are generated in such a manner that they are separated by black intervals selected to induce a blink in the eye of a viewer. The duration and occurrence of these black intervals are defined by blink signals. By using these blink signals the projector, broadly speaking, mimics or imitates the operation of the shutter on a standard movie projector. In this manner the quality and smoothness of the images being projected is visibly improved. Preferably the black intervals are synchronized so that at least one black interval occurs during each frame. The black intervals have a duration in the range of 1–20 msec.

In another aspect of the invention, a digital projector adapted to generate moving images from a stream of data consisting of digital frames is disclosed having an input adapted to receive the stream of data and a timer adapted to generate blink signals in synchronism with the digital frames. An optical image generator is used to generate a sequence of optical images corresponding to the sequence of digital frames, the optical images being separated by or interspaced by black intervals defined by the blink signals, the black intervals being spaced to induce a blink effect in the eyes of the viewers.

The optical image generator preferably includes a light source generating light and an optical modulator receiving the light and modulating it in accordance with digital frames. The projector further includes a mixer adapted to generate control signals for the optical modulator in accordance with the digital frames and the blink signals. The mixer is adapted to generate modified frames, each frame including a black interval and data from one of the digital frames.

In another aspect of the invention a method of generating moving images from data is disclosed by generating blink signals selected to induce a blink effect in the eyes of a viewer; converting the data into images; and projecting said images and the blink signals in sequence with images being interspaced by blink signals. Preferably no light is projected during said black intervals.

BRIEF DESCRIPTION OF THE DRAWINGS

FIGS. 3A, 3B, 3C and 3D illustrate the distortion generated while the images of a vertically moving object are digitized;

DETAILED DESCRIPTION OF THE INVENTION

Figure 1A:
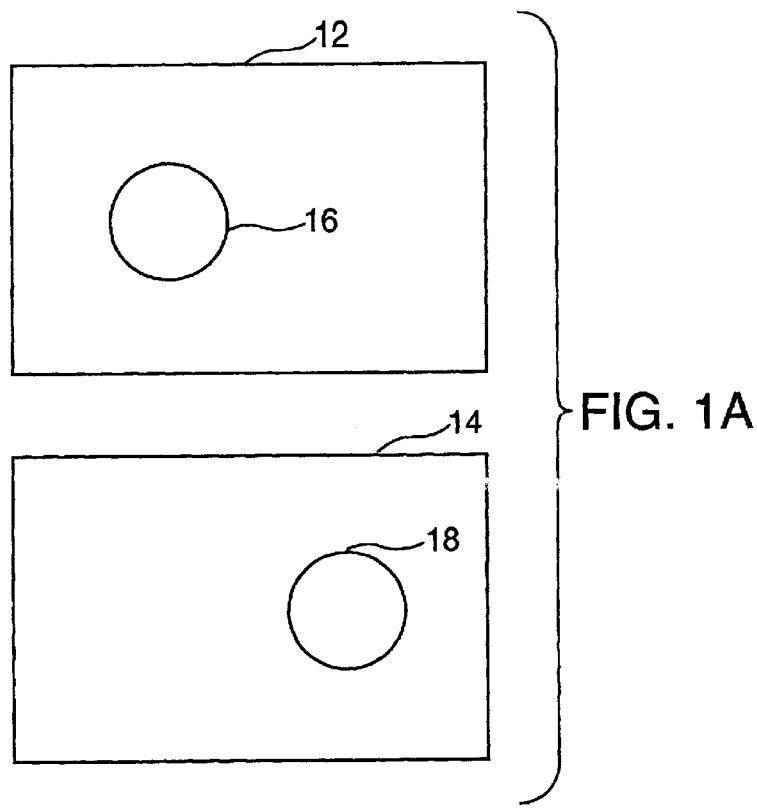
FIGS. 1A, 1B and 1C show how two images may appear to a viewer, depending on the interval between the images and other factors.
Figure 1B:
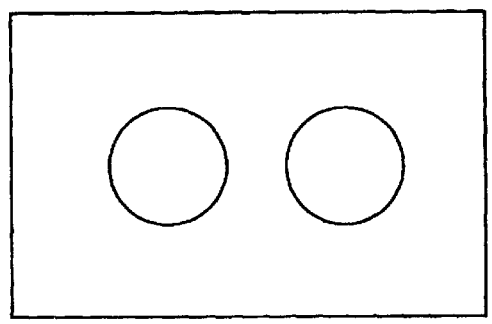
Figure 1C:
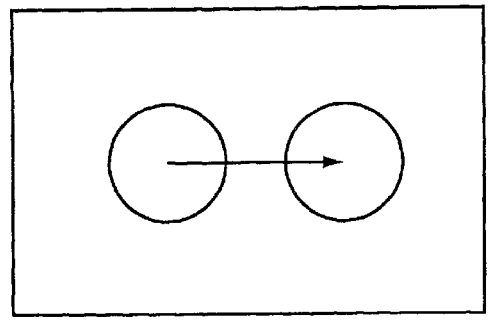

FIGS. 1A–1C illustrate the problems associated with frames projected at a very high or very low rates. FIG. 1A shows two frames 12 and 14 which are projected sequentially on a screen. Fame 12 includes a circular image 16 and frame 14 includes a circular image 18 which has the same size as image 16 but is laterally displaced within the frame 14 with respect to the position of the image 16 in frame 12. Thus the two images 16 and 18 are said to be projected so that they are both spatially and temporally spaced. The two objects may represent an article that has changed position between the two frames. Alternatively the positions of the images 16, 18 are different due to camera movement. In any event, when a viewer is shown the two frames 12, 14 sequentially, what a viewer sees depends on a number of parameters, such as the time interval between the two frames, and the spacing between the images 16, 18 relative to their size. Based on these parameters, a viewer will see one of three possible views. With a relatively large time interval between the two images, in the order of over 200 msec (or if the viewing angle between the two images 16, 18 is too large), then the viewer sees two sequential, separate images just as seen in FIG. 1A. If the frames 12, 14 are shown with a small time interval therebetween, typically less than 30 msec, then the viewer see a single frame with the images 16, 18 appearing simultaneously, as seen in FIG. 1B. However, if the two frames are shown within about 30–200 msec of each other, the eye of the viewer is tricked into seeing a moving image from the position of image 16 to the position of image 18, as shown in FIG. 1C.

Figure 2:
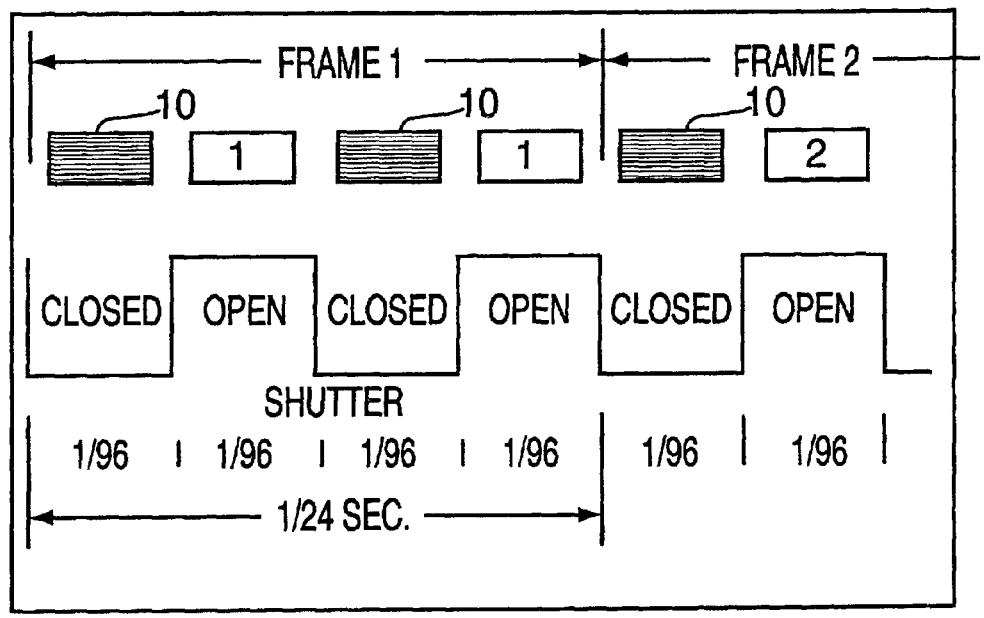
FIG. 2 shows sequential frames separated by black intervals are generated by a standard movie projector.

As discussed above, this blink effect is obtained by a standard movie projector by taking advantage of the three different phenomena discussed above. The appearance of motion of the image is enhanced and smoothed by the black intervals. For example, as illustrated in FIG. 2, a standard projector projects 24 frames per second. Typically, during each frame period, a shutter within the projector opens and closes twice. When the shutter is opened, light passes through the film and is focused on the screen to reproduce the image from the film on the screen. When the shutter is closed, light is blocked, resulting in black intervals 10 being interposed between the images 10A. Thus, in FIG. 2, two image intervals 1 are generated during the first frame, two image intervals 2 are generated during the second frame and so on. Each black interval 10 and each image 10A are 1/96 sec long, so that the projector can be said to be symmetric and to have a 50% duty cycle.

Figures 3A, 3B:
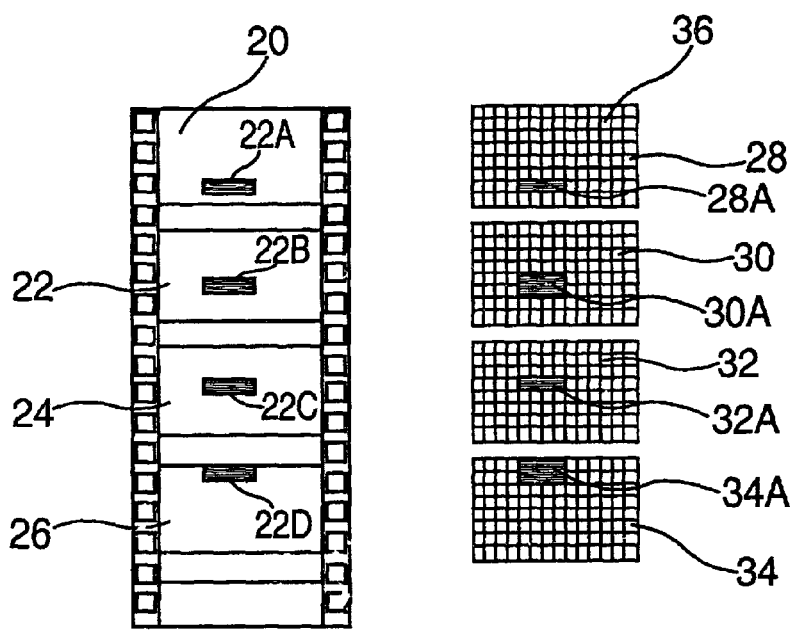

However, since existing digital projectors do not generate black intervals, the quality of the moving images generated by such projectors is inferior to the quality of moving images from the standard FIGS. 3A and 3B illustrate another problem associated with digital imaging technology. FIG. 3A shows a sequence of four frames 22, 24, 26, 28 each including a respective image 22A, 24A, 26A, 28A. The images 22A–28A can represent, for example, a generally rectangular object moving upward. FIG. 3B represent four digitizing grids 30, 32, 34, 36 of a digital camera or other similar means used to generate digital data corresponding to the frames 22–28. Because in this particular example, the size of the images is an integer multiple of the size of the grid cells 30 of each grid, as each frame is scanned, because the article is moving and because of spatial sampling artefacts, the shape and size of the resulting scanned images are not identical. More specifically, images 28A, 32A are one scan row smaller in the vertical direction then alternate images 30A, 34A. While this artefact may occur with a still image, it is much more pronounced with a moving image causing the image to change size and to have blurred or fuzzy edges. An example of this artefact occurs the film credits roll vertically. The effect blurs the letters and causes them to shrink and expand rhythmically, in a disconcerting pattern.

Similarly, if the article is moving at a certain rate which is a fraction of the scanning rate, as its image is digitized, since the corresponding objects must be offset by an integer number of scan lines, the resulting moving image is jumpy, with intermittent bumps and jerks instead of a smooth motion. A further problem is generated by a fast moving article. If this movement of the article is too fast relative to the scanning rate, the objects in the frames are displaced too fast resulting again in a jerky and uneven perceived movement, and if the speed of the article is high enough, multiple objects for each article may appear on each frame.

These problems may be generally referred to as temporal quantization errors produced when the digital camera does not allow for sufficient number of samples to be taken. The problems could be resolved by increasing the scanning rate, however this approach is not very desirable since it results in much more data then needed.

The present inventors have discovered that the problems described above can be substantially reduced or eliminated if in each projected frame, a black interval is introduced within each frame. This interval induces a blink effect in the viewers' eyes in the same manner as the black intervals caused by the shutter in a standard movie projector, and results in images that appear to be moving more smoothly and evenly then without the blink effect.

Figure 4:
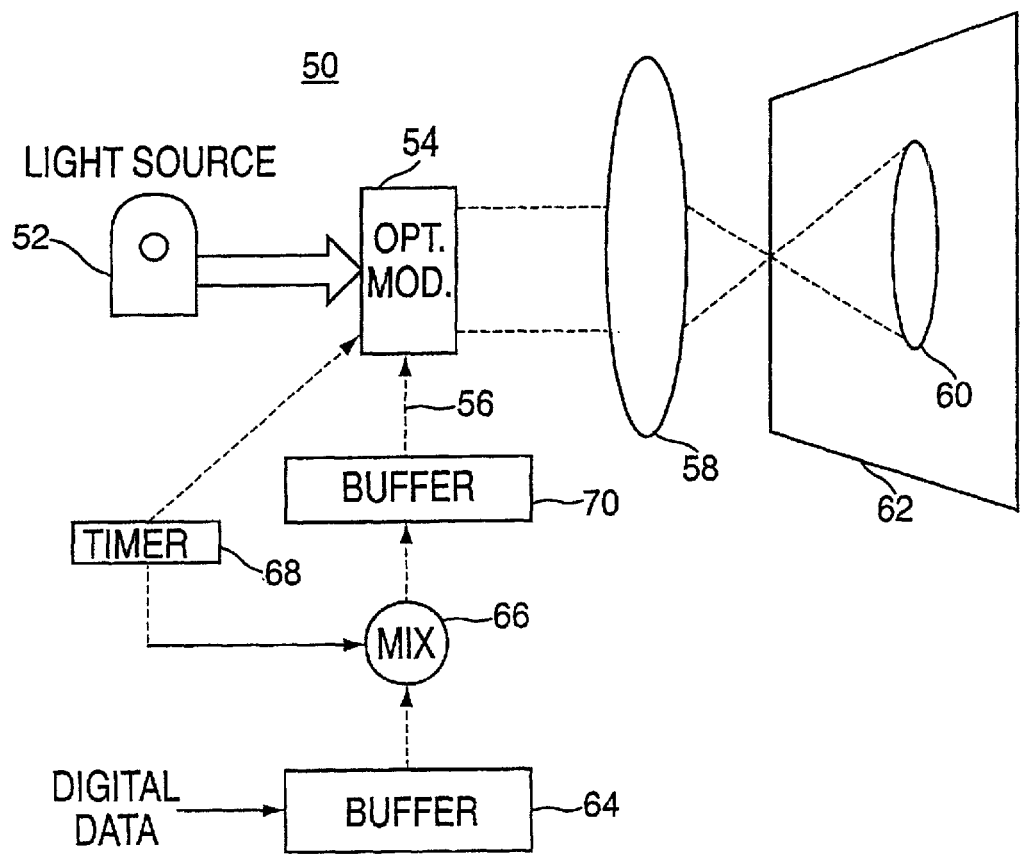
FIG. 4 shows a block diagram of a digital projector constructed in accordance with this invention.

FIG. 4 shows a block diagram of a digital projector modified to insert black intervals to separate image frames for the purpose of eliminating the temporal and spatial artefacts discussed above. The projector 50 in FIG. 4 includes a light source 52 which is typically an electric lamp. The light from the light source 52 is directed at an optical modulator 54 that modulates this light to generate images. For example the optical modulator 54 may comprise a plurality of LCD cells (not shown) activated by control signal 56. An alternate scheme developed by Texas Instruments utilizes microscopic mirrors instead of LCD cells. The modulated light is then sent to an optical system 58 that projects and focuses the resulting image 60 on a screen 62.

In order to generate images, the projector 50 receives a stream of input data. The input data is stored into a buffer 64. From the buffer 64, a portion of the data, for example, data corresponding to a single frame, is fed to a mixer 66. The mixer 66 combines the input data with timing signals received from a timer 68.

Figure 5:
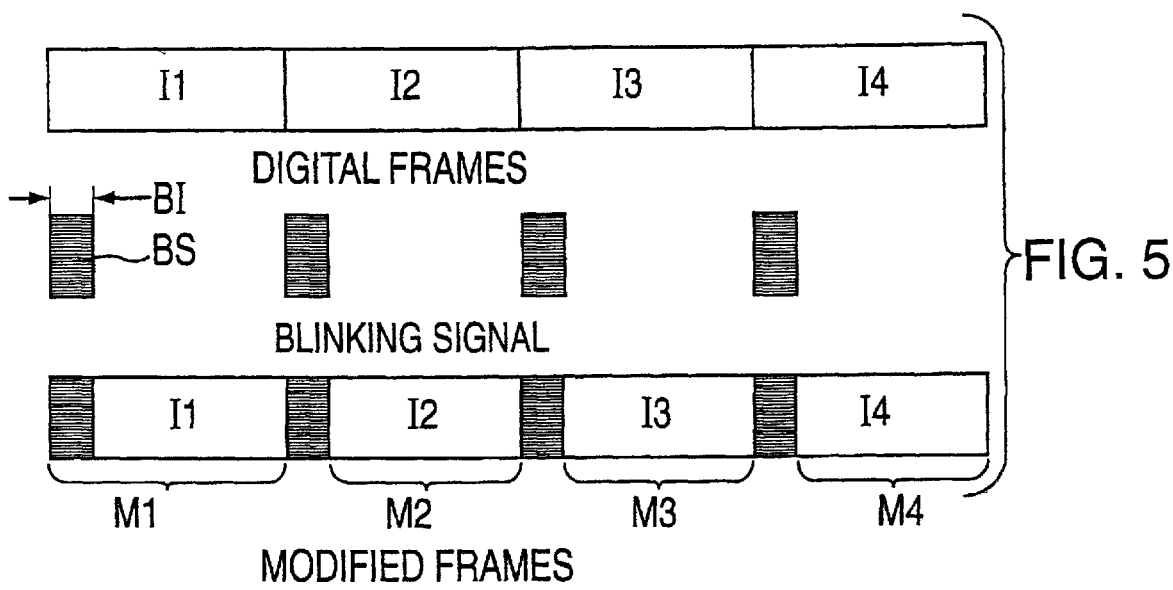
FIG. 5 shows the frames and black intervals generated by the digital projector of FIG. 4.

For example, in FIG. 5, the input digital data is shown as consisting of several digital frames I1, I2, I3, . . . , each frame corresponding to a respective image. The timer 68 generates signals defining a blink signal BS having a specific blink interval BI. The timer 68 is synchronized to the digital frames so that a blink signal BS is generated for each digital frame I1, I2, . . .

The mixer 66 superimposes a blink signal BS on each digital frame I1, I2 . . . resulting in modified frames M1, M2, M3 . . . As seen in FIG. 5, each modified frame Mn consists of the blink signal BS and a digital data portion In.

The modified frames Mn are stored in a buffer 70. The optical modulator receives each modified frame Mn in sequence and and operates as follows. First, it generates a black interval in accordance with the blink signal BS. In the embodiment shown the interval BI of the blink signal in effect defines the length of the black interval. Alternatively, the blink signal may be an encoded signal that defines the desired length of the black interval. During the black interval, no light is generated by the optical modulator. Following this black interval, the data digital data portion of the frame is used in the normal manner to modulate the output of the optical modulator.

One skilled in the art will appreciate that the actual modifications required to implement the invention on existing digital projectors is fairly minimal. The only new elements added to the projector 50 are the buffer 64, mixer 66 and timer 68. These elements are standard elements that may be implemented by discrete components or, since the digital projector 50 is normally microprocessor controlled, the elements may be implemented by software.

Instead of using a mixer 66, a similar effect may be accomplished by connecting the timer 68 directly to the optical modulator 54. In this arrangement, the operation of the optical modulator 54 is modified so that its output is disabled in the presence of the blink signal. The net result is the same as the one illustrated in FIG. 5.

Multiple blink signals could be provided for each digital frame with the total duration of these blink signals adding up to a predetermined ratio, such as half the duration of the digital frame thereby achieving the same 50% duty cycle as the standard movie projector. However, such a long duration may be undesirable since it cuts the overall luminosity of the images on screen 62 considerably, it is not really necessary. Moreover, this approach may be too complicated to implement.

The black intervals need not have a 50% duty cycle. Black intervals of much shorter duration can be utilized to achieve the same blink effect. For example, the black interval may be ⅙th of the frame duration. More specifically, for 24 frames/sec, the duration of each modified frame is 41.66 msec. A black interval with an interval BI of 6.9 msec could be used with the remaining 34.7 msec being reserved for projecting the respective image.

This process or method of inducing a blink effect in a viewer is referred to as asymmetrical stroboscopy. In accordance with the Talbot-Plateau law, the light efficiency of the projector 50 is changed from 50% in case of a 50% duty cycle to 83.33%. This arrangement results in a 66% improvement in light output. In general, the blink interval must be at least 50% of the total frame duration.

Obviously, numerous modifications may be made to this invention without departing from its scope as defined in the appended claims.

I claim:

1. A digital projector comprising:
an input receiving digital data defining image frames; and
an optical modulator generating a series of images corresponding to said digital data, said images being separated by black intervals, said optical modulator generating said black intervals with a duration selected to induce a blink effect in the eye of a viewer, to improve relative motion perception.

2. The projector of claim 1 wherein said series of images includes a sequence of frames, said optical modulator generating said sequence of frames.

3. The projector of claim 2 wherein said optical modulator generates at least one black interval for each frame.

4. The projector of claim 1 wherein said black intervals have a duration in the range of 1–20 msec.

5. The projector of claim 1 wherein said optical modulator produces images defined by frames characterized by a frame duration, wherein said blink interval is about 50% of said frame duration.

6. A digital projector projecting moving images from a stream of data arranged in digital frames, said projector comprising:
an input receiving said stream of data;
a timer generating blink signals in synchronism with said digital frames, said blink signals defining a black interval having a duration selected to induce a blink effect to improve relative motion perception; and
an optical image generator that generates a sequence of optical images corresponding to said sequence of digital frames, said optical images being separated by said black intervals.

7. The projector of claim 6 wherein said optical image generator does not project any significant light during said black intervals.

8. The projector of claim 6 wherein said optical images are generated during frames having frame durations, and wherein said black intervals at least 50% of said frame durations.

9. The projector of claim 6 further comprising a light source generating light and an optical modulator receiving said light and modulating said light in accordance with digital frames to form images.

10. The projector of claim 9 further comprising a mixer generating control signals for said optical modulator in accordance with said digital frames and said blink signals.

11. The projector of claim 10 wherein said mixer generates modified frames, each frame including a black interval and data from one of said digital frames.

12. A method of generating moving images from data comprising:
generating blink signals defining black intervals having a duration selected to induce a blink effect in the eyes of a viewer to improve relative motion perception;
converting said data into images; and
projecting said images on a screen with said images being separated by said black intervals.

13. The method of claim 12 wherein no substantial light is projected during said black intervals.

14. The method of claim 12 further comprising defining frames having frame durations that define the rate at which said images are projected.

15. The method of claim 14 wherein said black intervals are at least 50% of said frame durations.

16. The method of claim 12 wherein said data is partitioned into digital frames, the data of each frame defining a corresponding image, and wherein one black interval is associated with each digital frame.

17. The method of claim 12 wherein said blink signals are selected to imitate the blinking of the viewer's eye.

* * * * *

UNITED STATES PATENT AND TRADEMARK OFFICE
CERTIFICATE OF CORRECTION

PATENT NO. : 6,784,971 B2
DATED : August 31, 2004
INVENTOR(S) : Klamer, Paul R

It is certified that error appears in the above-identified patent and that said Letters Patent is hereby corrected as shown below:

Title page,
Item [73], Assignee, should read -- Time Warner Entertainment CO., L.P. Burbank, CA --.

Signed and Sealed this

Thirtieth Day of August, 2005

JON W. DUDAS
*Director of the United States Patent and Trademark Office*